Patented Sept. 24, 1946

2,408,095

UNITED STATES PATENT OFFICE 2,408,095

HIGHLY USEFUL COMPOUNDS

William Jennings Peppel, Wilmington, Del., assignor to E. I. du Pont de Nemours & Company, Wilmington, Del., a corporation of Delaware No Drawing. Application November 11, 1943,
Serial No. 509,895

6 Claims. (Cl. 260—455)

This invention relates to the alpha-halogeno-beta-acylthiopropionic acids and their esters.

The alpha-halogeno-beta-acylthiopropionic acids and their esters constitute a hitherto unknown class of compounds. These compounds are of great interest in chemical syntheses because of the presence of three reactive groups in the same molecule. For example, they can be converted to the corresponding monothiols by controlled hydrolysis of the acylthio group, or to the corresponding dithiols by simultaneous or stepwise replacement of both the acylthio and halogen groups by thiol groups. They may also be converted to a variety of derivatives by exchange of the halogen atom for other groups according to known methods.

An object of this invention is the new class of organic compounds, viz., the alpha-halogeno-beta-acylthiopropionic acids and their esters. Another object is to provide a general process leading to these compounds in excellent yields. Other objects will appear hereinafter.

These objects are accomplished by the present invention wherein a thiol carboxylic acid, e. g., thiolacetic acid is reacted with an alpha-halogeno-acrylic acid wherein the halogen is of atomic weight above 20, or an ester thereof, whereby an alpha-halogeno-beta-acylthiopropionic acid, or an ester thereof, is produced.

The products of this invention have the general formula

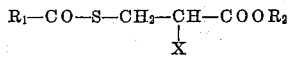

wherein X is halogen, $R_1$ is a monovalent hydrocarbon radical and $R_2$ is hydrogen or the non-hydroxyl portion of an alcohol.

The more detailed practice of the invention is illustrated by the following examples, wherein parts given are by weight. There are, of course, many forms of the invention other than these specific embodiments.

Example I

To 100 parts of alpha-chloroacrylic acid is added 78 parts of thiolacetic acid. An exothermic reaction starts at once and, within five minutes, the temperature of the reaction mixture reaches 120° C. External cooling is then applied to prevent an excessive temperature rise. After 15 minutes, the mixture is cooled somewhat, dissolved in 160 parts of hot benzene, and 115 parts of petroleum ether are added. Upon cooling in ice water, the reaction product crystallizes. It is filtered and dried, giving 130 parts (yield: 91% of the theory) of alpha-chloro-beta-acetylthiopropionic acid. The acid may be purified by recrystallization from petroleum ether. It forms white crystals melting at 75° C.

If desired, a few drops of ascaridole may be added to the initial reaction mixture, in which case the reaction is even more vigorous than when no catalyst is employed. The yield in alpha-chloro-beta-acetylthiopropionic acid is substantially the same.

Analyses: Calculated for $C_5H_7O_3ClS$: C, 32.8%; H, 3.8%; S, 17.5%; Cl, 19.5%; neutralization equivalent, 182.5. Found: C, 32.9%; H, 4.3%; S, 17.6%; Cl, 19.9%; neutralization equivalent, 189.

Instead of the free alpha-chloroacrylic acid, an ester thereof may be used, as shown in the following example:

Example II

To 90 parts of methyl alpha-chloroacrylate is added 57 parts of thiolacetic acid. After standing in the sunlight for one-half hour, the mixture becomes hot, though no external cooling is necessary. After 24 hours at room temperature and ordinary room illumination, the reaction product is distilled at reduced pressure. There is obtained 103 parts (yield: 84% of the theory) of pure methyl alpha-chloro-beta-acetylthiopropionate, boiling at 72° C. at 1 mm. and having a refractive index $N_D^{25}=1.4898$.

Analyses. Calculated for $C_6H_9O_3ClS$: S, 16.3%; Cl, 17.9%. Found: S, 16.6%; Cl, 17.8%

The process of this invention is applicable to any alpha-haloacrylic acid or ester wherein the halogen is of atomic weight above 20 and to any thiolcarboxylic acid wherein the radical attached to the thiocarboxyl group is hydrocarbon. There may thus be obtained alpha-bromo-beta-acetylthiopropionic acid, alpha-iodo-beta-propionylthiopropionic acid, ethyl alpha-bromo-beta-butyrylthiopropionate, propyl alpha-chloro-beta-lauroylthiopropionate, butyl alpha-chloro-beta-acetylthiopropionate, cyclohexyl alpha-iodo-beta-acetylthiopropionate, dodecyl alpha-bromo-beta-benzoylthiopropionate, octadecyl alpha-chloro-beta-acetylthiopropionate, phenyl alpha-chloro-beta-propionylthiopropionate, benzyl alpha-bromo-beta-acetylthiopropionate, the poly-(alpha-halogeno-beta-acetylthio) propionates of polyhydric alcohols such as ethylene glycol, hexamethylene glycol, glycerol, etc. The alcohol esterified with the alpha-halogenoacrylic acid may be aliphatic, cycloaliphatic, aromatic, alkylaromatic and may contain inert groups such as alkoxy, aryloxy, thioether, sulfone, etc. The alpha-halogenoacrylic ester may be a phenol ester. Thiolacetic acid is the most available and preferred thiolcarboxylic acid.

The reaction of thiolcarboxylic acids with the alpha-halogenoacrylic acids or esters proceeds in general quite readily. If desired, it can be accelerated by the use of an addition-promoting catalyst such as ascaridole or benzoyl peroxide, or by the use of physical agents such as heat or ultraviolet light. Solvents such as benzene, toluene or aliphatic hydrocarbons may be used. The reaction product, according to its nature, may be isolated by crystallization, filtration, distillation or any other convenient method.

The above description and examples are intended to be illustrative only. Any modification of or variation therefrom which conforms to the spirit of the invention is intended to be included within the scope of the claims.

What is claimed is:

1. Process for making an alpha-halogeno-beta-acetylthiopropionic compound which comprises reacting thiolacetic acid with an alpha-halogenoacrylic compound of the class consisting of alpha-chloroacrylic acid and its methyl ester.
2. Alpha-chloro-beta-acetylthiopropionic acid.
3. Methyl alpha-chloro-beta-acetylthiopropionate.
4. An organic compound of the class consisting of alpha-chloro-beta-acetylthiopropionic acid and its methyl ester.
5. Process for making alpha-chloro-beta-acetylthiopropionic acid which comprises reacting thiolacetic acid with alpha-chloroacrylic acid.
6. Process for making methyl alpha-chloro-beta-acetylthiopropionate which comprises reacting thiolacetic acid with methyl alpha-chloroacrylate.

WILLIAM JENNINGS PEPPEL.